United States Patent
Sakaguchi (10) Patent No.: US 8,395,107 B2
(45) Date of Patent: Mar. 12, 2013

(54) OPTICAL FIBER PHOTOELECTRIC SENSOR WITH IMPROVED LIGHT COUPLING

(75) Inventor: Tomikazu Sakaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 478 days.

(21) Appl. No.: 12/712,322

(22) Filed: Feb. 25, 2010

(65) Prior Publication Data

US 2010/0243870 A1   Sep. 30, 2010

(30) Foreign Application Priority Data

Mar. 26, 2009  (JP) ................................. 2009-075982

(51) Int. Cl.
*G02B 6/26* (2006.01)
*G02B 6/36* (2006.01)

(52) U.S. Cl. ..................................... 250/227.24; 385/88

(58) Field of Classification Search ............. 250/227.24, 250/221; 385/88–94
See application file for complete search history.

(56) References Cited

U.S. PATENT DOCUMENTS

| | | | |
|---|---|---|---|
| 5,485,317 A * | 1/1996 | Perissinotto et al. | 359/712 |
| 6,392,214 B1 * | 5/2002 | Okamoto | 250/205 |
| 2006/0139575 A1 * | 6/2006 | Alasaarela et al. | 353/31 |

FOREIGN PATENT DOCUMENTS

| | | |
|---|---|---|
| JP | 59-180515 | 10/1984 |
| JP | 09-307144 | 11/1997 |
| JP | 2004253423 A * | 9/2004 |

\* cited by examiner

*Primary Examiner* — Thanh Luu
(74) *Attorney, Agent, or Firm* — Kilyk & Bowersox, P.L.L.C.

(57) ABSTRACT

The present invention provides a main body unit of an optical fiber photoelectric sensor and the optical fiber photoelectric sensor, which improves optical coupling efficiency of a light emitting element and a light projecting side optical fiber and is capable of making uniform light incident on the light projecting side optical fiber without highly accurately positioning the light emitting element and a condenser lens. The main body unit of the optical fiber photoelectric sensor makes light emitted from an LED chip converge by the condenser lens and incident on the light projecting side optical fiber; and also makes light not incident on the condenser lens and emitted around the condenser lens reflect by a reflecting surface provided around the condenser lens, then refract the reflected light by a refractive surface, and incident on the light projecting side optical fiber.

5 Claims, 9 Drawing Sheets

OPTICAL FIBER PHOTOELECTRIC SENSOR WITH IMPROVED LIGHT COUPLING

CROSS-REFERENCE TO RELATED APPLICATIONS

The present application claims foreign priority based on Japanese Patent Application No. 2009-075982, filed Mar. 26, 2009, the contents of which is incorporated herein by reference.

BACKGROUND OF THE INVENTION

1. Field of the Invention

The present invention relates to photoelectric sensors which project light toward an object to be detected and receives reflected light or transmitted light thereof, thereby detecting presence or absence and information such as color of an object to be detected; and more particularly, relates to a main body unit of an optical fiber photoelectric sensor and the optical fiber photoelectric sensor, which projects light toward the object to be detected via an optical fiber.

2. Description of the Related Art

Conventionally, there has been used an optical fiber photoelectric sensor which includes a fiber sensor head to which an optical fiber cable is connected and a main body unit which projects light to a detection area via the fiber sensor head and receives transmitted light or reflected light thereof in order to detect presence or absence of an object, dimensions of the object, a distance between the objects, a position of the object, a shape of the object, colors, and the like. A light projecting unit which is for emitting light to an optical fiber and a light receiving unit which receives light from the optical fiber are provided inside the main body unit.

A light emitting diode (LED) is generally used as a light projecting unit. The LED includes an LED chip which is mounted on the surface of a substrate connected to a lead wire and a translucent resin sealing layer which is formed so as to cover the LED chip. A light projecting side optical fiber is butted to the resin sealing layer of the LED, and light emitted from the LED chip is guided to the inside of the light projecting side optical fiber.

Optical coupling efficiency with respect to the light projecting side optical fiber of a light emitting element is used as a parameter showing detecting capability of the optical fiber photoelectric sensor. The optical coupling efficiency mentioned herein is the parameter showing proportion of light actually radiated to an area to be detected for the total amount of emitted light emitted by the light emitting element. When the optical coupling efficiency is small, an amount of projected light contributing to detection is small and therefore high detecting capability cannot be obtained. The amount of emitted light needs to be increased by flowing a large current to the light emitting element in order to obtain high detecting capability. However, in this case, it becomes a problem in that specifications of the light emitting element are limited, consumption energy is increased, and life span of the light emitting element becomes short.

Figure 9:
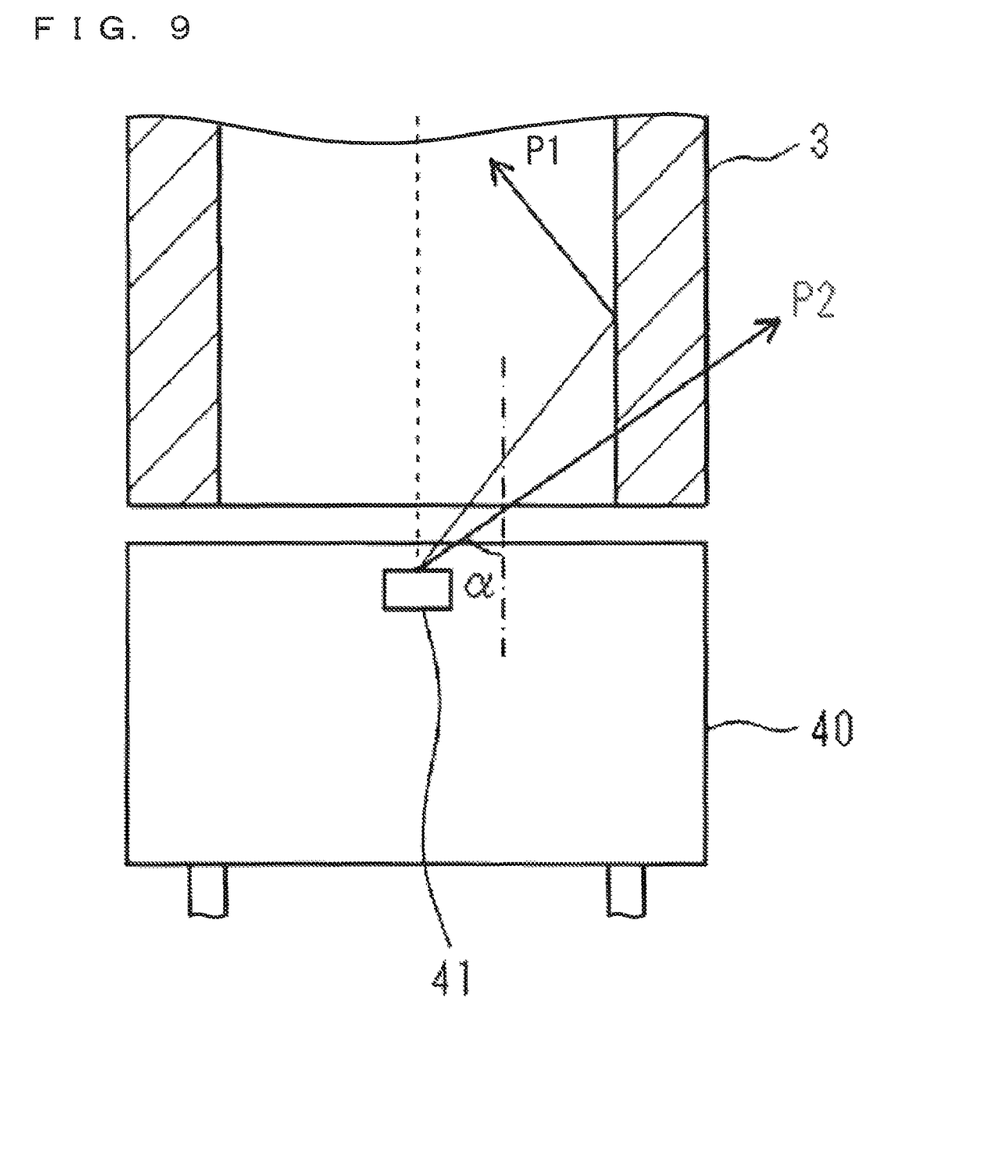
FIG. 9 is a schematic view for describing a light beam flow of a conventional LED.

In order to enhance the above-mentioned optical coupling efficiency, as shown in FIG. 9, it is conceivable to arrange an LED chip 41 serving as the light emitting element near an incident end surface of a light projecting side optical fiber 3. This arrangement makes it possible to make most of light emitted from an LED chip 41 incident on the optical fiber. However, light P2 emitted at an incident angle at a certain degree or more with respect to an optical axis of the LED chip 41 is radiated to the outside of the optical fiber after the light is incident on the optical fiber. This is because that an incident angle α made by the light P2 to the optical fiber does not satisfy reflecting conditions in the inside of the optical fiber; and therefore, the light P2 is emitted to the outside without reflecting on the inside. Consequently, even if the light emitting element is merely arranged near an end surface of the light projecting side optical fiber 3, an amount of light incident on optical fiber from the light emitting element increases; however, light loss at the optical fiber becomes large by just that much; and therefore, resultant optical coupling efficiency cannot be enhanced.

Figure 10:
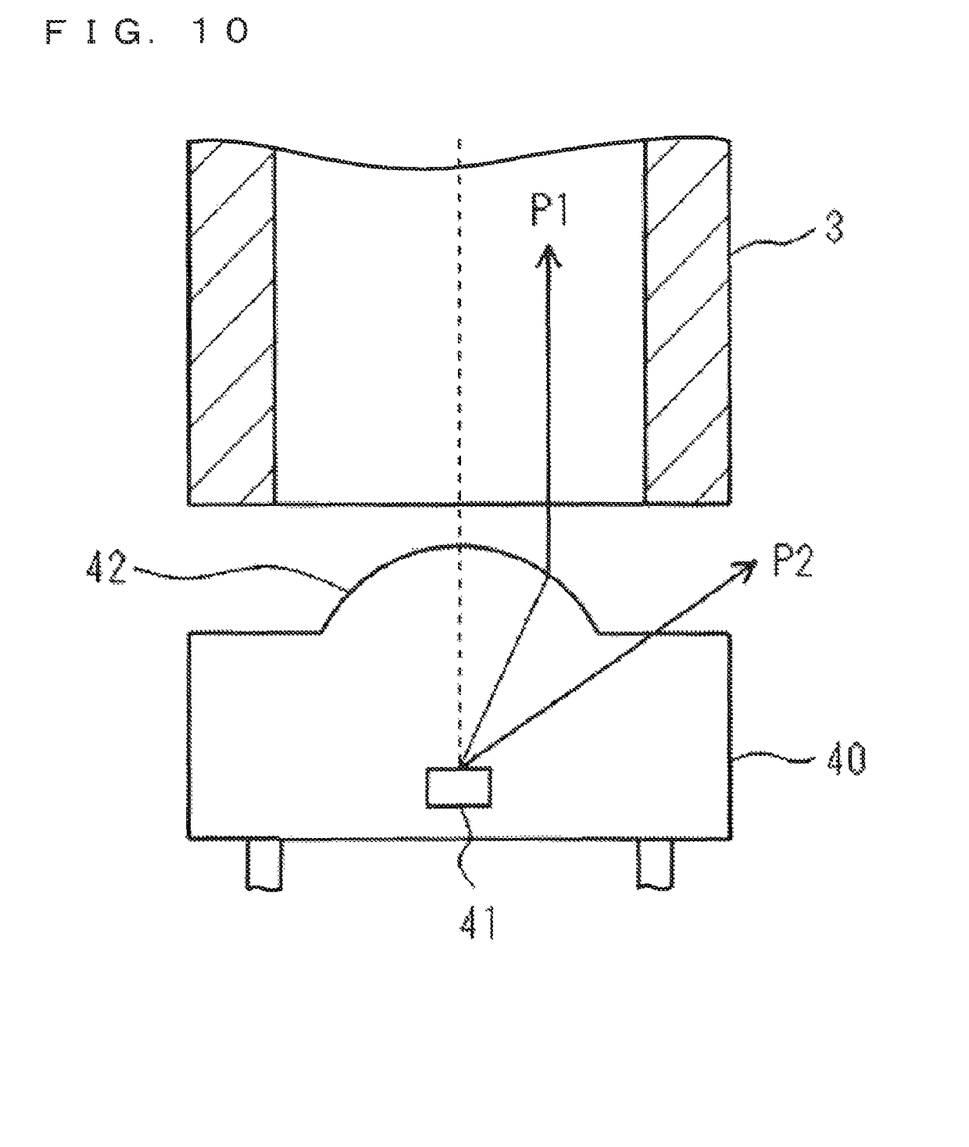
FIG. 10 is a schematic view for describing the light beam flow of the conventional LED.

Furthermore, as shown in FIG. 10, it is conceivable to provide a condenser lens 42 in front of an LED chip 41 (for example, see Japanese Unexamined Patent Publication Nos. S59-180515 and H9-307144). According to such a configuration, it is possible to make light radially radiated from an LED chip 41 effectively incident on an end surface of a light projecting side optical fiber 3 by a function of the condenser lens 42. However, generally, the LED chip 41 radially emits light from an emission surface; and therefore, of the light radiated from the LED chip 41, light P2 emitted at an angle at which light is not incident on the condenser lens 42 is not subject to the converging function of the condenser lens 42; as a result, the light P2 is not incident on the optical fiber. Therefore, when the LED chip 41 is arranged close to the condenser lens 42 in order to make the light P2 incident on the optical fiber, an incident angle α made by the light P2 to the optical fiber becomes large; and light loss at the optical fiber becomes large after all.

Figure 11:
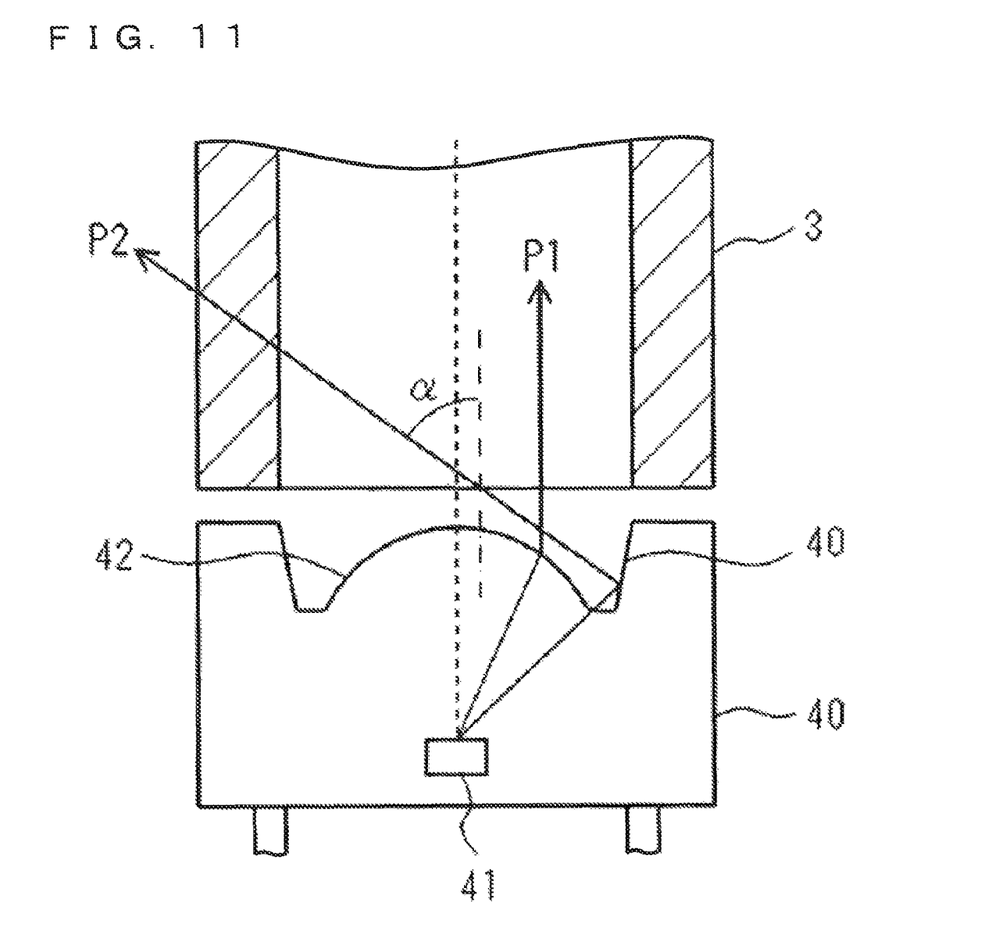
FIG. 11 is a schematic view for describing a light beam flow of an LED of a comparative example.

In order to solve the above-mentioned problems, it is conceivable to provide a reflecting surface 40 which reflects light emitted to a direction not incident on a condenser lens 42 as shown in FIG. 11, thereby making all light emitted from an LED chip 41 incident on an optical fiber. However, even with such a configuration, light P2 reflected by the reflecting surface 40 is incident on the optical fiber at a relatively large incident angle α; and therefore, in the case where the incident angle α does not satisfy reflecting conditions of the optical fiber; after all, light P2 is radiated to the outside of the optical fiber. Consequently, even by adopting such a configuration, the light emitted from the LED chip 41 cannot be sufficiently coupled to the optical fiber.

Figure 12:
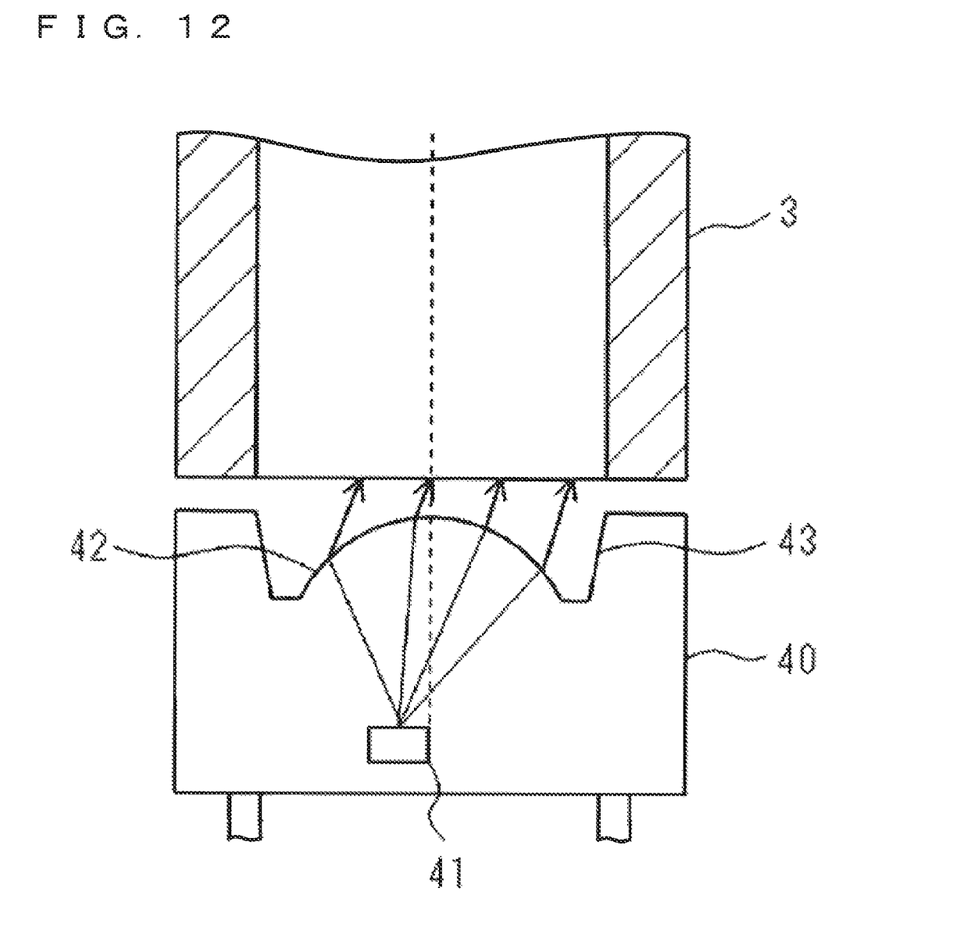
FIG. 12 is a schematic view for describing the light beam flow of the LED of the comparative example.

Furthermore, different from the above-mentioned problem, generally in an optical fiber photoelectric sensor, there is a problem in that when light is not uniformly incident on an incident end surface of a light projecting side optical fiber 3, a deviation is generated in an optical axis of light emitted from the other end surface on the projecting light side is deviated. FIG. 12 is a view showing a light beam flow in the case where a central axis of an LED chip is slightly deviated from an optical axis of a condenser lens 42. In this case, distribution of the light incident on the optical fiber is converged to a right side region with respect to the optical axis of the condenser lens 42; and therefore, a distribution of an amount of incident light becomes non-uniform. In order to make the light uniformly incident on the light projecting side optical fiber 3, an LED chip 41 and an optical axis of the condenser lens 42 need to be correctly positioned; and attachment needs to be made so that a central axis of the light projecting side optical fiber 3 is correctly coincided with the optical axis. However, generally, correct positioning of the axes is not easy; and therefore, this causes difficulty in manufacturing and an increase in manufacturing cost.

SUMMARY OF THE INVENTION

The present invention has been made in view of the aforementioned problem, and an object of the present invention is to provide a main body unit of an optical fiber photoelectric sensor and the optical fiber photoelectric sensor, which improves optical coupling efficiency of a light emitting element and a light projecting side optical fiber and is capable of making uniform light incident on the light projecting side optical fiber without highly accurately positioning the light emitting element and a condenser lens.

An optical fiber photoelectric sensor of the present invention includes a light projecting side optical fiber which guides light to be projected toward a detection area, a light receiving side optical fiber which receives light from the detection area and guides the light, and a main body unit which is connected to the light projecting side optical fiber and the light receiving side optical fiber. As the optical fiber, various kinds of materials such as plastic and glass can be used. In this case, the main body unit includes an integrated type or separated type attaching portion which is for attaching the light projecting side optical fiber and the light receiving side optical fiber, a light projecting unit which projects light to the light projecting side optical fiber attached to the attaching portion, and a light receiving unit which receives light received by the light receiving side optical fiber; and the main body unit detects an object to be detected in the detection area based on an amount of light received by the light receiving unit. The light projecting unit includes a light emitting element which emits light (for example, a surface light emitting diode, a whole light emitting diode, and an laser diode); a condenser lens which is provided between the light emitting element and one end surface of the light projecting side optical fiber attached to the attaching portion, and converges light emitted from the light emitting element to one end surface of the light projecting side optical fiber attached to the attaching portion; a reflecting surface which is provided around the condenser lens in a substantially concentric circle shape with respect to an optical axis of the condenser lens, and makes light emitted from the light emitting element to around the condenser lens reflect in a direction coming close to the optical axis of the condenser lens; and a refractive surface which is provided between the condenser lens and the reflecting surface in a concentric circle shape or substantially concentric circle shape with respect to the optical axis of the condenser lens, and makes the light reflected by the reflecting surface refract from the direction coming close to the optical axis of the condenser lens (for example, a direction with many vertical components with respect to an optical axis connecting the light emitting element and the condenser lens) to a direction along the optical axis (for example, a direction with many horizontal components with respect to the optical axis connecting the light emitting element and the condenser lens) and incident on one end surface of the light projecting side optical fiber attached to the attaching portion.

First, of the light emitted from the light emitting element, light emitted in a predetermined direction near the optical axis is made incident on the condenser lens. The light incident on the condenser lens is converged to the light projecting side optical fiber and is transmitted in the optical fiber. Furthermore, of the light emitted from the light emitting element, light emitted apart from the optical axis and to around the condenser lens is reflected in the direction coming close to the optical axis by the reflecting surface provided around the condenser lens, and then the reflected light is refracted in the direction along the optical axis by the refractive surface provided between the condenser lens and the reflecting surface. The light refracted by the refractive surface is incident on the light projecting side optical fiber at a relatively small incident angle $\alpha$; and therefore, the light is transmitted inside in a state satisfying reflection conditions of the optical fiber and is not radiated to the outside of the optical fiber. According to a configuration of the present invention, it becomes possible to make the light not incident on the condenser lens in addition to the light incident on the condenser lens refract on the reflecting surface after reflecting on the reflecting surface, and make the light incident on the light projecting side optical fiber at a relatively small incident angle $\alpha$ satisfying total reflection conditions. Therefore, the light emitted by the light emitting element can be very efficiently coupled to the light projecting side optical fiber.

Further, according to the configuration of the present invention, even if a deviation is generated between a central axis of the light emitting element and the optical axis of the condenser lens, uniformity of an amount of light incident on the light projecting side optical fiber is maintained. For example, in the case where the optical axis of the light emitting element is slightly deviated to the left with respect to the optical axis of the condenser lens, the light incident on the condenser lens is converged to the right side of the light projecting side optical fiber. However, the optical axis of the light emitting element is deviated to the left with respect to the optical axis of the condenser lens; and therefore, the light is reflected by the reflecting surface provided around the condenser lens and then an amount of light refracted by the refractive surface and incident on the light projecting side optical fiber is converged to the left side. That is, an amount of light converged by the condenser lens and the amount of light incident via the reflecting surface and the refractive surface without via the condenser lens are in an interpolation relationship with each other; and therefore, even if a certain amount of deviation is generated between the light emitting element and the optical axis of the condenser lens, optical coupling efficiency is not extremely lowered. With such a configuration, highly accurately optical axis adjustment between the light emitting element and the condenser lens is not necessary at a production step; and therefore, it becomes possible to achieve easy production and reduction in manufacturing cost.

Furthermore, the light projecting unit of the main body unit of the optical fiber photoelectric sensor may include a translucent resin layer which seals a light emitting diode chip; and the condenser lens, the reflecting surface, and the refractive surface may be integrally formed by forming the translucent resin layer.

Accordingly, the condenser lens, the reflecting surface, and the refractive surface are formed by forming the translucent resin layer which seals the light emitting diode chip; and therefore, it is possible to easily manufacture with a small number of components.

Furthermore, the main body unit of the optical fiber photoelectric sensor may be provided with a groove portion having a substantially concentric circle shape with respect to the optical axis of the condenser lens on a surface of the translucent resin layer facing one end surface of the light projecting side optical fiber, and the reflecting surface may be an inner circumferential surface coming very close to the condenser lens of the groove portion.

Accordingly, the reflecting surface is easily formed by providing the groove portion on the surface of the translucent resin layer facing the light projecting side optical fiber; and therefore, a different member such as a reflecting plate does not need to be provided in order to form the reflecting surface. In addition, a surface butted to the light projecting side optical fiber can be ensured at the surface of the translucent resin layer facing the light projecting side optical fiber.

Further, the light projecting side optical fiber may be a multi-core optical fiber in which a plurality of fibers are bundled and which includes a light projecting lens provided at an end surface through which light is projected to the detection area.

Accordingly, it is convenient to pull around an optical fiber cable because the multi-core optical fiber is stronger against bending than a single core optical fiber. Furthermore, an amount of incident light to the optical fiber is uniform; and therefore, even if the multi-core optical fiber is used and light is emitted to the detection area via the light projecting lens, an optical axis deviation is not generated at an emission end surface.

According to the present invention, there can be provided an optical fiber photoelectric sensor with a simple configuration, which is capable of enhancing optical coupling efficiency to an optical fiber and making light uniformly incident on the optical fiber even when positional deviation is generated at an LED chip.

DETAILED DESCRIPTION OF THE INVENTION

Hereinafter, one embodiment of the present invention will be described with reference to drawings. In the embodiment shown below, as an example, a light emitting diode (hereinafter, LED) in which a surface light emitting diode chip (hereinafter, LED chip 17) is resin-molded as a light projecting unit and a transparent optical fiber photoelectric sensor in which a photodiode (hereinafter, PD) is used as a light receiving element will be described.

Figure 1:
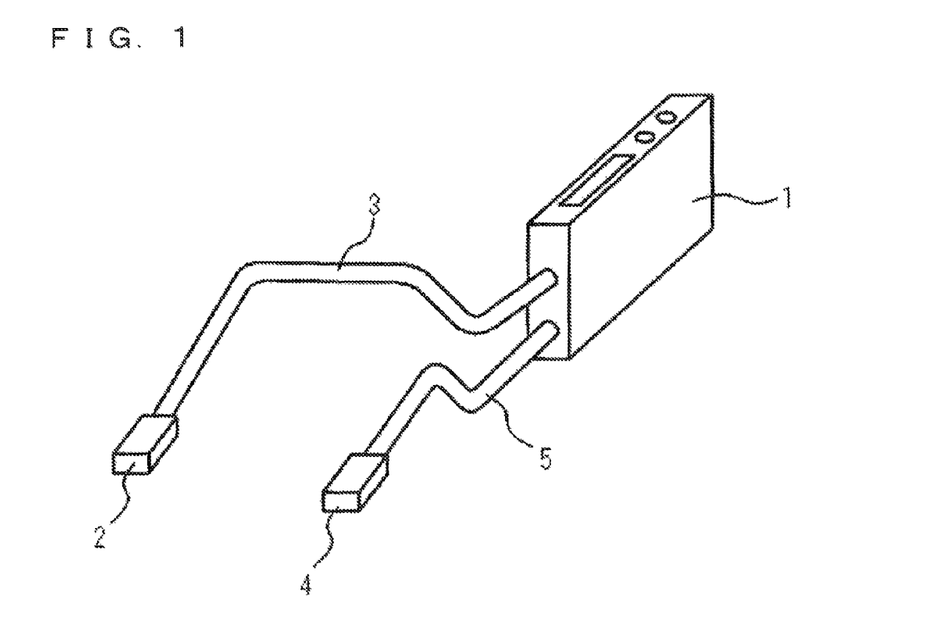
FIG. 1 is an outer appearance perspective view showing a whole configuration of a fiber photoelectric sensor of the present embodiment.

FIG. 1 is a schematic perspective view showing a whole of the optical fiber photoelectric sensor in the embodiment of the present invention. The optical fiber photoelectric sensor in the present embodiment includes a main body unit 1 serving as a main body, a light projecting side optical fiber 3 which is inserted in the main body unit 1 and guides light to be projected to a detection area, and a light receiving side optical fiber 5 which receives light from the detection area. A light projecting head 2 which projects light and a light receiving head 4 which receives light are mounted to end portions of the optical fibers, respectively. The main body unit 1 serving as the main body has a narrow and relatively elongated box shaped casing; and on a front wall thereof, openings which are for attaching the light projecting side optical fiber 3 and the light receiving side optical fiber 5 are provided.

The light projecting head 2 projects light guided by the light projecting side optical fiber 3 to the area to be detected. The light receiving head 4 captures light from the detection area and transmits the light to the main body unit 1 via the light receiving side optical fiber 5. The main body unit 1 detects presence or absence of an object to be detected in the detection area based on an amount of light received via the light receiving side optical fiber 5.

Figure 2:
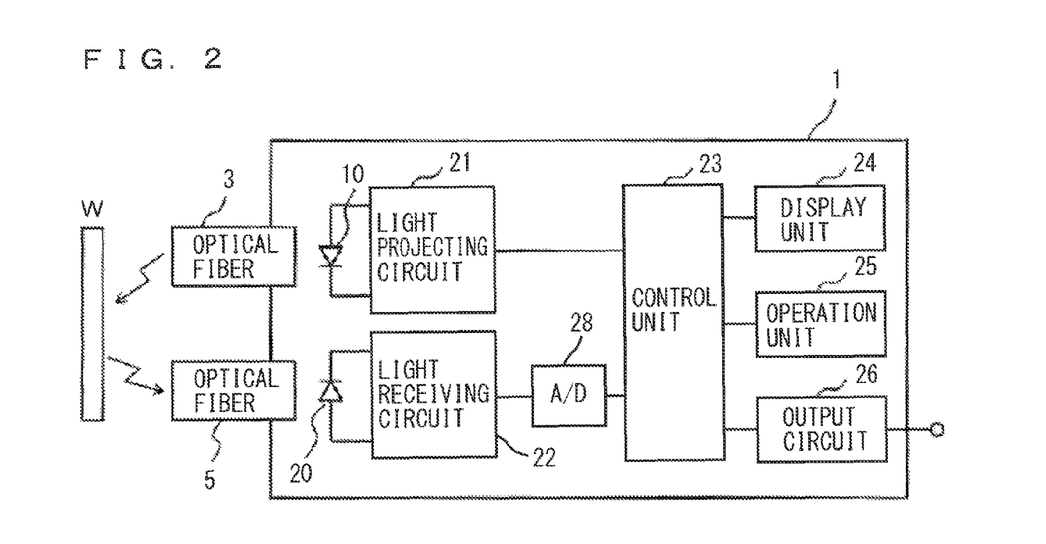
FIG. 2 is a block diagram showing an internal configuration of the fiber photoelectric sensor of the present embodiment.

FIG. 2 is a block diagram showing a whole outline of the main body unit 1. The main body unit 1 includes an LED 10 serving as the light projecting unit and a light projecting circuit 21 which is for driving the LED 10. Furthermore, the main body unit 1 includes a PD 20 (photodiode) serving as a light receiving unit, a light receiving circuit 22 for driving the PD 20, an A/D converter 28 which A/D converts an output signal from the light receiving circuit 22, a control unit 23 including a gate array and CPU which control a display unit 24 and an operation unit 25, and an output circuit 26 which delivers a signal from the control unit 23 to the outside. The control unit 23 controls the light projecting circuit 21 to drive the LED 10 and projects light to the detection area via the light projecting side optical fiber 3. Light from the detection area is incident on the light receiving side optical fiber 5 and the PD 20 receives the light. The light received by the PD 20 is A/D converted by the A/D converter 28 via the light receiving circuit 22 and inputted to the control unit 23. The control unit 23 judges the presence or absence of an object in the detection area based on an amount of received light inputted and outputs to the output circuit 26.

Figure 3:
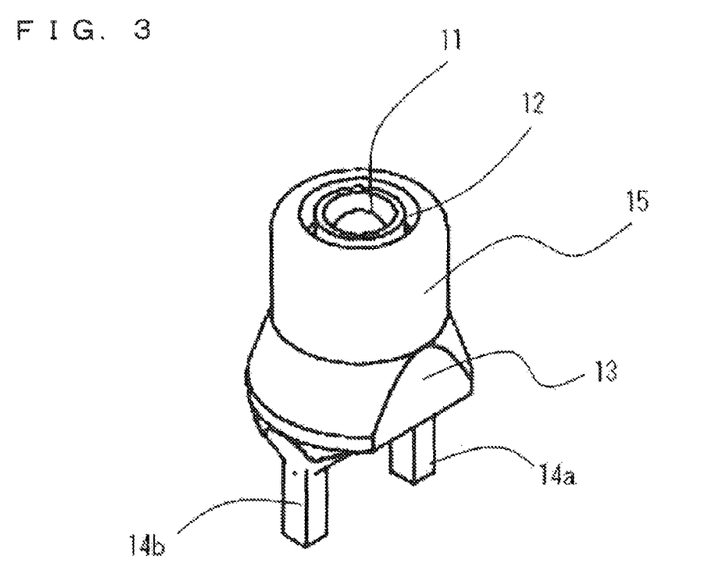
FIG. 3 is an outer appearance perspective view showing an outer appearance of an LED of the present embodiment.
Figure 4:
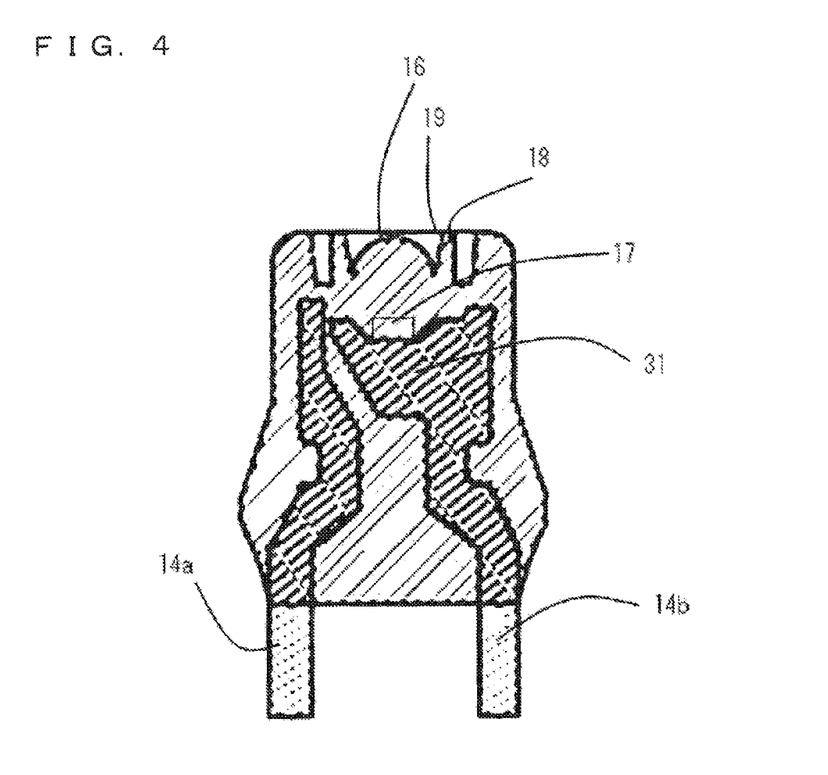
FIG. 4 is a sectional view showing an internal configuration of the LED of the present embodiment.

Subsequently, a configuration and a function of the LED 10 serving as a main unit of the present invention will be described in detail. FIG. 3 is an outer appearance perspective view of the LED 10 serving as the light projecting unit; and FIG. 4 is a sectional view of the LED 10. The LED 10 includes an anode lead 14b made of metal, a cathode lead 14a made of metal as well, the surface light emitting diode chip 17 serving as a light emitting element, a substrate 31 on which the LED chip 17 is mounted, and a translucent resin 15 which molds these components. The translucent resin 15 is made of, for example, epoxy resin excellent in inflammability. The translucent resin 15 is provided with a horizontal portion 13 in order to be stably held inside the main body unit 1. Furthermore, although not shown in the figure, a bonding wire is connected from the anode lead 14b to the LED chip 17. The light emitting element is the surface light emitting diode chip in the present embodiment; however, it is to be understood that a whole surface light emitting diode and other light emitting diode may be used; and in that case, there may be adopted a configuration in which a reflecting surface is provided around the LED chip to enhance light luminous efficiency.

A light emitting portion 11 serving as a portion which emits light and a groove portion 12 annularly provided around the light emitting portion 11 are formed on the upper surface of the LED 10, the upper surface being a surface facing an end surface of the light projecting side optical fiber 3. The light emitting portion 11 is a portion from which light emitted by the LED chip 17 is radiated to the outside and the portion from which light is guided to the light projecting side optical fiber 3. The groove portion 12 is a portion in which a groove is annularly formed around the light emitting portion 11, and a function of the groove portion will be described later.

A condenser lens 16 is formed in front of an emitting direction of light of the LED chip 17 arranged on the substrate 31 so that a central axis of the LED chip 17 substantially coincides with an optical axis. The condenser lens 16 converges light emitted from the LED chip 17 and converges the light to the end surface of the light projecting side optical fiber 3. A reflecting surface 18 is formed around the condenser lens 16 in a substantially concentric circle shape with respect to the optical axis of the condenser lens 16, and a refractive surface 19 is formed between the condenser lens 16 and the reflecting surface 18 in a substantially concentric circle shape as well. Any of the condenser lens 16, the reflecting surface 18, and the refractive surface 19 is a part of the translucent resin 15 which seals the LED chip 17, and is formed by forming the translucent resin 15.

Figure 5:
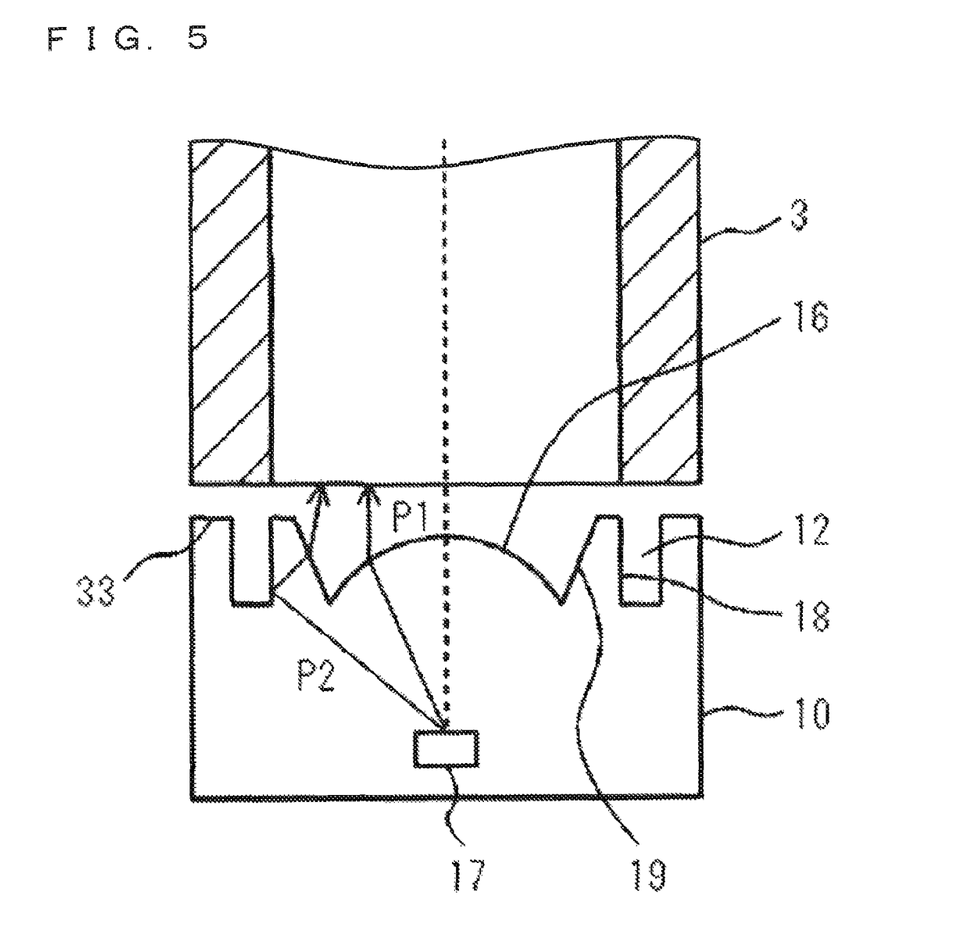
FIG. 5 is a schematic view for describing a light beam flow of the LED of the present embodiment.

FIG. 5 is a view schematically showing a light beam flow emitted from the LED chip 17. An emission surface of the LED chip 17 actually has a certain amount of area; however, for easy understanding, only a light beam flow emitted from one point on the LED chip 17 is schematically shown in this case.

As shown in FIG. 5, light beams emitted from the LED chip 17 are radially spread. Light beams P1 emitted to a direction near the optical axis of the condenser lens are incident on the condenser lens 16 and then incident on the light projecting side optical fiber 3 in reaction to a converging function of the condenser lens 16. Each of the light beams P1 is incident on the light projecting side optical fiber 3 at a relatively small incident angle by the converging function of the condenser lens 16. Consequently, the light incident on the light projecting side optical fiber 3 in reaction to the converging function of the condenser lens 16 does not satisfy reflection conditions of the optical fiber and is not likely to be radiated to the outside of the light projecting side optical fiber 3.

On the other hand, light beams P2 emitted to a direction apart from the central axis of the LED chip 17 is not incident on the condenser lens 16, and does not receive the converging function of the condenser lens 16. As described above, the groove portion 12 is annularly formed around the condenser lens 16. Although description will be made in detail later, generally, a refractive index of the translucent resin 15 made of epoxy resin or the like is larger than that of air, and an interface between the translucent resin 15 and the groove portion 12 that is in the air functions as a total reflection surface 18 with respect to a region of the light beams P2 incident at an incident angle of a predetermined angle or more. Consequently, the light beams P2 not incident on the condenser lens 16 are incident on the reflecting surface 18 and then reflected to set a course in a direction coming close to the optical axis.

The refractive surface 19 on which light reflected by the reflecting surface 18 is refracted from a direction toward the optical axis of the condenser lens 16 to a direction along the optical axis is formed between the condenser lens 16 and the reflecting surface 18 in a substantially concentric circle shape with respect to the optical axis of the condenser lens 16. The refractive surface is an interface between the translucent resin 15 and the light emitting portion 11 that is in the air. The light reflected by the reflecting surface 18 is refracted by the refractive surface 19 to a direction toward the light projecting side optical fiber 3 and is incident on the light projecting side optical fiber 3.

Figure 6:
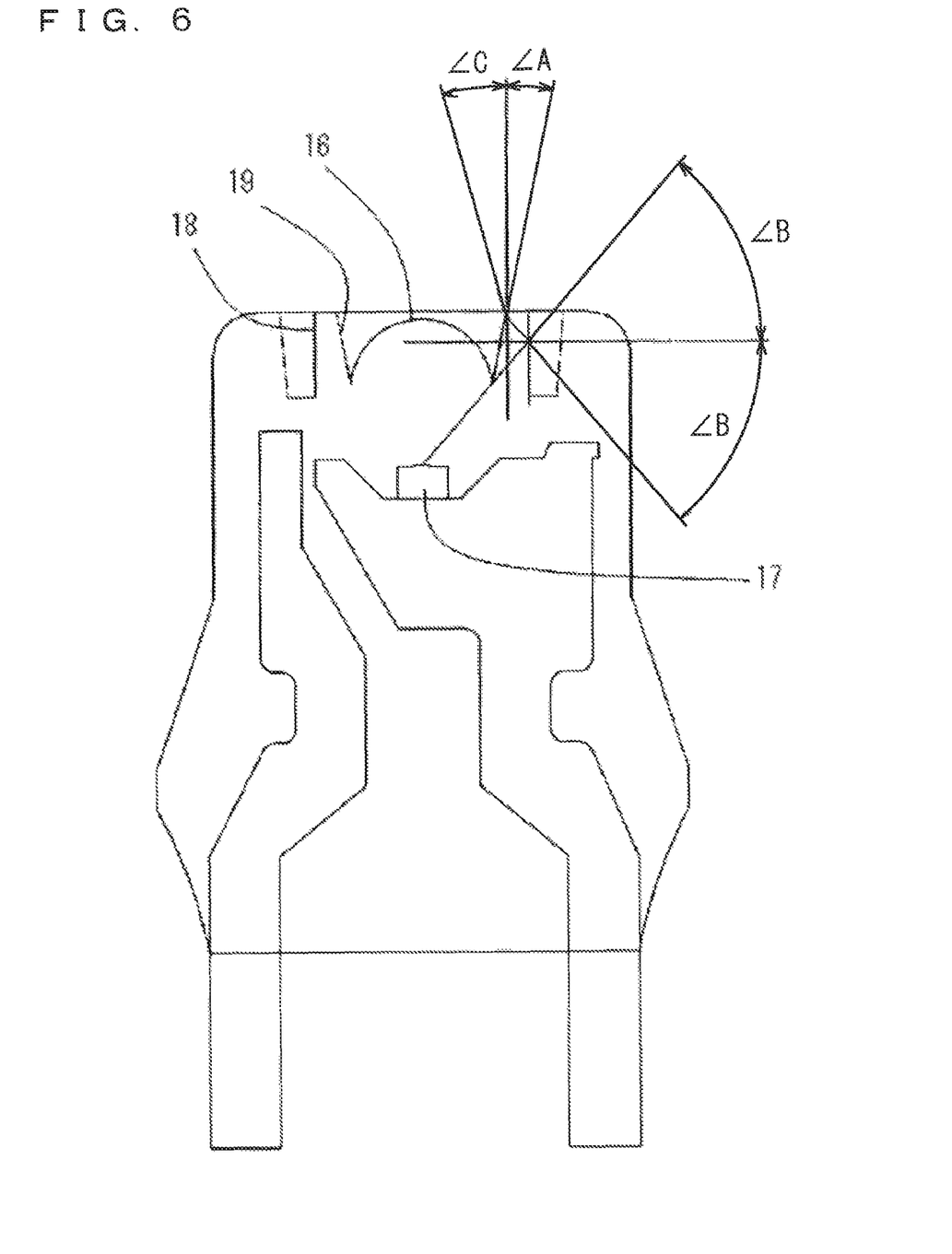
FIG. 6 is an enlarged schematic view for describing a light beam flow of the LED of the present embodiment.

FIG. 6 is a view describing a path of light not incident on the condenser lens 16 in detail. When a refractive index of the translucent resin 15 is set to N, the reflecting surface 18 is set in parallel to the optical axis of the condenser lens 16, and an incident angle of the light from the LED chip 17 to the reflecting surface 18 is set to $\angle B$; conditions in which the light emitted from the LED chip 17 performs total reflection are $$N*\operatorname{Sin} B \geqq \operatorname{Sin} 90°, \quad (1)$$

and when the refractive index is set to N=1.53, the incident angle becomes as follows:

$$\operatorname{Sin} B \geqq 0.65 \quad (2)$$

$$B \geqq 40.7 \quad (3)$$

Consequently, a relative position between the LED chip 17 and the reflecting surface 18 is determined so that the incident angle to the reflecting surface 18 satisfies the above conditions.

Subsequently, when an angle made by the refractive surface 19 and a direction parallel to the optical axis of the condenser lens 16 is set to $\angle A$, a relationship of respective angles is expressed by the following equation so that the light reflected by the reflecting surface 18 is not reflected by the refractive surface 19 but is incident on the optical fiber at an incident angle $\angle C$:

$$N*\operatorname{Sin}(B-A)=\operatorname{Sin}(90-A-C) \quad (4)$$

When the equation is solved using the above values, the equation becomes as follows:

$$A=\operatorname{Arctan}((1.16+\operatorname{Cos} C)/(1-\operatorname{Sin} C)) \quad (5)$$

Preferably, the incident angle to the optical fiber is approximately 30 degrees in order to make light transmit while performing total reflection in the optical fiber and make incident the light refracted by the refractive surface 19 without converging toward a peripheral portion of the light projecting side optical fiber 3. Consequently, when $\angle C$ is set to 30 degrees to find the above-mentioned $\angle A$, the resultant $\angle A$ is approximately 11.4 degrees. That is, the refractive surface 19 is set so that the angle $\angle A$ is approximately 11.4 degrees; and accordingly, it becomes possible to make the light incident on the light projecting side optical fiber 3 at an incident angle of 30 degrees. An arrangement position of the LED chip 17 is determined in accordance with these values, a focal position of the condenser lens 16, and an outermost shape and a position of the optical fiber to be attached.

As described above, in the present embodiment, of the light emitted from the LED chip 17, light not incident on the condenser lens 16 is reflected to a direction coming close to the optical axis of the condenser lens 16 by the reflecting surface 18 provided at an appropriate position and an angle. However, even when the light reflected by the reflecting surface 18 is directly incident on the light projecting side optical fiber 3; the light is not transmitted in the optical fiber, but is radiated to the outside. Therefore, the light reflected by the reflecting surface 18 is made incident on the light projecting side optical fiber 3 via the refractive surface 19 provided at an appropriate position and an angle; and accordingly, it becomes possible to make the light incident at a relatively small angle without radiating from the light projecting side optical fiber 3 to the outside. With such a configuration, in the present embodiment, of the light emitted from the LED chip 17, the light incident on the condenser lens 16 and most of the light incident on the peripheral reflecting surface 18 thereof can be coupled to the light projecting side optical fiber 3; and therefore, optical coupling efficiency to the light projecting side optical fiber 3 can be dramatically enhanced. More particularly, if a surface light emitting diode whose light luminous efficiency to the front direction is high is used as the LED chip 17, most of the amount of emitted light can be coupled to the light projecting side optical fiber 3.

In this case, there is shown an example of the case assumed that the reflecting surface 18 is formed substantially in parallel to the optical axis of the condenser lens 16 and the refractive index of the translucent resin 15 is set to 1.53; however, each relative positional relationship is intricately changed depending on the angle and the position of the reflecting surface 18, the refractive index of resin to be adopted, the reflection conditions of an optical fiber to be adopted, and the like. Furthermore, in the above example, there is shown the example of the case where the light beam flow is emitted from one point of the LED chip 17 and is incident on the reflecting surface 18 at the angle ∠B; however, an actual emission surface of the LED chip 17 has a certain predetermined area and light is incident on the reflecting surface 18 at various incident angles. Consequently, determination of a distant relationship between the LED chip 17 and the condenser lens 16 and detailed design particulars such as positions and angles of the reflecting surface 18 and the refractive surface 19 are experimentally made while measuring the optical coupling efficiency to the optical fiber and uniformization effect of a distribution of an amount of light to be described later.

Furthermore, in the present embodiment, there is shown an example in which the reflecting surface 18 is perpendicular to the upper surface of the LED 10; however, it is not always necessary to be perpendicular, and the reflecting surface 18 may be inclined if the inclination has an angle at which the light from the LED chip 17 can be partly reflected. Actually, it is preferable that the closer the reflecting surface 18 comes to the optical fiber, the more the inclined surface inclines to a direction apart from the optical axis, because the incident angle to the optical fiber of the reflected light becomes small. However, such a configuration is difficult to manufacture; and therefore, in the present embodiment, the reflecting surface 18 is vertically formed. Alternatively, in the present embodiment, the reflecting surface 18 and the refractive surface 19 are made in a flat surface; however, it is not always necessary to be the flat surface, but may be made to be a curved surface.

Further, in the present embodiment, the reflecting surface 18 is formed by an inner circumferential surface of the groove portion 12 which is annularly provided at the upper surface of the LED 10. As described above, the interface between the translucent resin 15 and the air functions as a reflecting surface with respect to light incident at an incident angle satisfying reflection conditions; and therefore, the inner circumferential surface of the groove portion 12 can be the reflecting surface 18. With such a configuration, a separate reflecting plate or the like does not need to be prepared in order to form the reflecting surface 18. In addition, a peripheral portion of the groove portion 12 at the upper surface of the LED 10 serves as a butted surface 33 of the light projecting side optical fiber 3.

Figure 7:
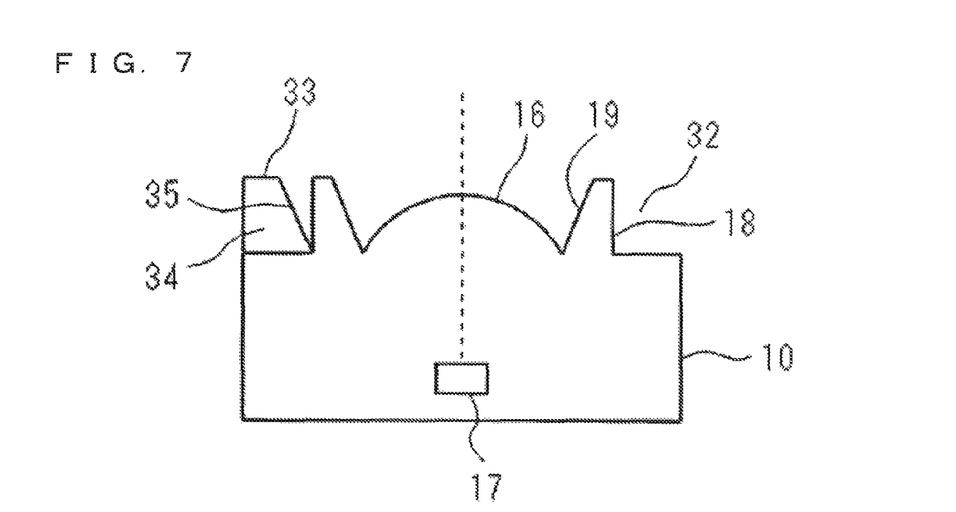
FIG. 7 is a schematic view of an LED in another embodiment of the present embodiment.

In a sense that the butted surface 33 of the light projecting side optical fiber 3 is ensured, the present embodiment is more preferable than a configuration, for example, in which the reflecting surface 18 is formed by an L shaped cutout portion 32 shown in FIG. 7. However, even in the case of the configuration shown in FIG. 7, a reflector 34 is arranged at the cutout portion 32; and accordingly, light can be surely reflected and the butted surface 33 can be ensured. In this case, different from the case where translucent resin is directly processed, an inclined surface 35 shown in FIG. 7 can be formed on the reflector 34. The inclined surface 35 can make light emitted from the translucent resin 15 to the outside without being reflected by the reflecting surface 18 reflect and make the reflected light incident on the optical fiber at a small incident angle. Alternatively, the reflecting surface 18 can be formed by applying reflexible coating on an outer circumferential surface of the translucent resin.

Incidentally, in the optical fiber photoelectric sensor, there is a problem in that if light is not uniformly incident on the light projecting side optical fiber 3, uneven brightness is generated in irradiation light at the other end side from which light is projected to a detection area. In order to prevent such uneven brightness, an arrangement position of the condenser lens 16 and the LED chip 17 needs to be highly accurately positioned so that both axes coincide with each other. In recent years, reduction in diameter due to high-densification of the optical fiber has advanced, these positioning largely exerts an influence on detecting capability as a sensor in the restriction in size as the optical fiber photoelectric sensor. Consequently, this incurs difficulty in manufacturing and an increase in manufacturing cost.

More particularly, in the case where the light projecting side optical fiber 3 is a multi-core optical fiber in which a plurality of fibers are bundled, uneven brightness of an amount of incident light to the optical fiber becomes a more serious problem. In the case where the optical fiber is a single core optical fiber, even when a distribution of the amount of incident light is not uniform, light is mixed during transmission process in the optical fiber and a certain level of uniform light is radiated from the whole emitting end. However, in the case of the multi-core optical fiber, light incident on each fiber is transmitted in each fiber; and therefore, a distribution of an amount of incident light nonuniformly incident directly becomes a distribution of an amount of nonuniform emitted light at the emitting end, and an optical axis deviation is generated in light to be radiated to the detection area via a light projecting lens. On the other hand, the multi-core optical fiber is a configuration in which a plurality of fibers are bundled; and therefore, the multi-core optical fiber is stronger against cable bending and tougher as compared to the single core optical fiber. Therefore, the multi-core optical fiber is preferably used in the case of use environment where a light projecting and receiving head has to be installed at a narrow area where cables cannot be pulled around.

Figure 8:
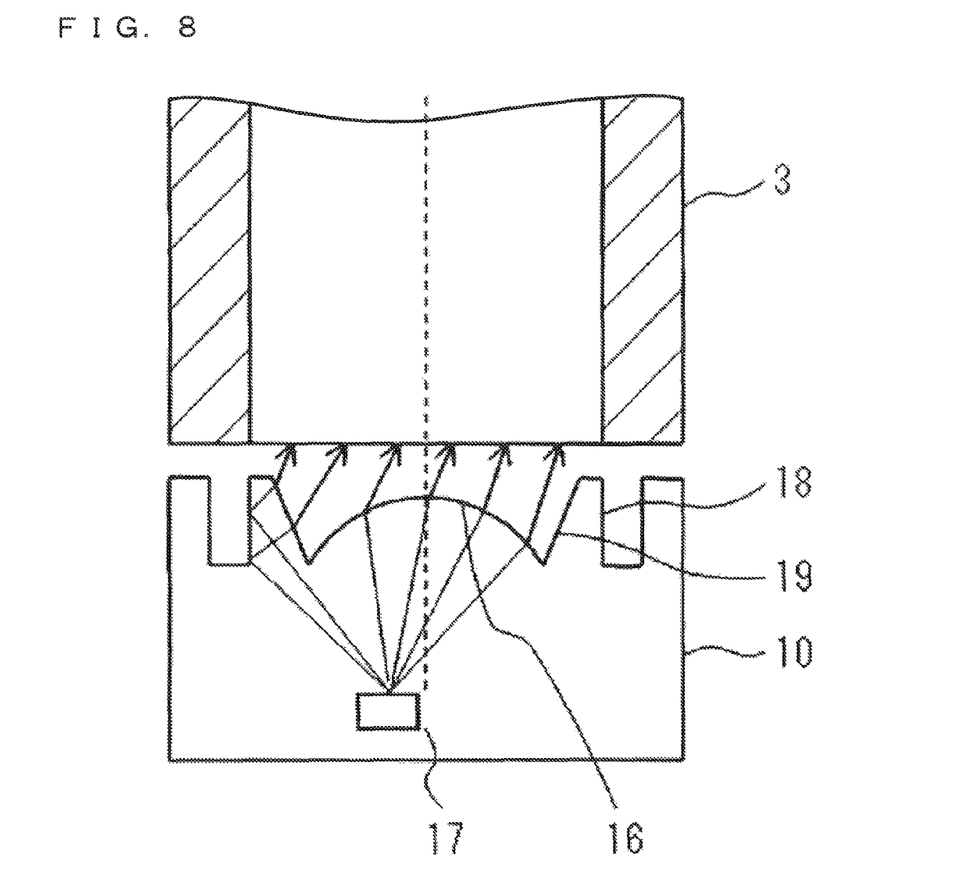
FIG. 8 is a schematic view for describing a light beam flow of an LED of the present embodiment.

FIG. 8 is a view showing a light beam flow in the case where the central axis of the LED chip 17 is deviated in a horizontal direction (left in the figure) with respect to an optical axis of a condenser lens 16 in the present embodiment. In the case where the optical axis of the LED chip 17 is slightly deviated to the left with respect to the optical axis of the condenser lens 16, light incident on the condenser lens 16 is converged to a right side region of a light projecting side optical fiber 3 as shown in FIG. 8. Conversely, the light is not incident on a left side region of the light projecting side optical fiber 3. However, the central axis of the LED chip 17 is deviated to the left with respect to the optical axis of the condenser lens 16; and therefore, an amount of light that is not incident on the condenser lens 16, but is reflected by a reflecting surface 18, then refracted by a refractive surface 19, and is incident on the light projecting side optical fiber 3 is converged to the left side region of the light projecting side optical fiber 3. That is, the light incident on the light projecting side optical fiber 3 via the condenser lens 16 and the light incident via the reflecting surface 18 and the refractive surface 19 without via the condenser lens 16 are in an interpolation relationship with each other (when one is coarse, the other is dense). Therefore, even one or more deviations are generated between the light emitting element and the optical axis of the condenser lens 16, coupling efficiency is not extremely lowered.

In the case where the condenser lens 16 is arranged closer to the LED chip 17, the distance from an emitting surface of the condenser lens 16 to an incident surface of the light projecting side optical fiber 3 is enlarged; and therefore, an amount of light is lowered as a whole. However, in the case where an optical axis deviation is generated between the LED chip 17 and the condenser lens 16, as described above, the light incident via the refractive surface 19 is mostly converged in a direction where the LED chip 17 is positionally deviated. On the other hand, the light incident via the condenser lens 16 is mostly converged in a reverse direction to a positional deviation direction of the LED chip 17 as the distance from the emitting surface of the condenser lens 16 to the incident surface of the light projecting side optical fiber 3 becomes long. That is, the condenser lens 16 and the LED chip 17 are arranged closely and accordingly an amount of light is lowered as a whole, while a mutual interpolation relationship between the light radiated via the refractive surface 19 and the light radiated via the condenser lens 16 becomes strong, and a distribution of an amount of light incident on the light projecting side optical fiber 3 can be further uniformized. Consequently, a relative positional relationship between the condenser lens 16 and the LED chip 17 is set in consideration of the balance of the amount of light incident on the light projecting side optical fiber 3 and uniformity of the amount of light.

As described above, the description has been made on an example of a transparent fiber photoelectric sensor of the present invention; however, it is to be clearly understood that the present invention can be applicable to a reflective fiber photoelectric sensor in which a light projecting head and a light receiving head are integrated. The present invention is not limited to the embodiments described herein and various modifications and alternations may be implemented without departing from the spirit or scope of the present invention as need arises.

What is claimed is:

1. A main body unit of an optical fiber photoelectric sensor, comprising:
    an attaching portion which attaches a light projecting side optical fiber that guides light to be projected toward a detection area and a light receiving side optical fiber that receives light from the detection area and guides the light;
    a light projecting unit which projects light to the light projecting side optical fiber attached to the attaching portion; and
    a light receiving unit which receives the light incident on the light receiving side optical fiber,
    the main body unit detecting an object to be detected in the detection area based on an amount of light received by the light receiving unit,
    the light projecting unit including:
    a light emitting element which emits light;
    a condenser lens which is provided between the light emitting element and the attaching portion so as to make the light emitted from the light emitting element converge to one end surface of the light projecting side optical fiber attached to the attaching portion;
    a reflecting surface which is provided around the condenser lens in a substantially concentric circle shape with respect to an optical axis of the condenser lens, and makes light emitted from the light emitting element to around the condenser lens reflect in a direction coming close to the optical axis of the condenser lens wherein the reflecting surface is perpendicular to the upper surface of the light projecting unit; and
    a refractive surface which is provided between the condenser lens and the reflecting surface in a substantially concentric circle shape with respect to the optical axis of the condenser lens, and makes the light reflected by the reflecting surface refract from the direction coming close to the optical axis of the condenser lens to a direction along the optical axis and incident on one end surface of the light projecting side optical fiber attached to the attaching portion, and
    wherein the light projecting unit includes:
    a light emitting diode chip serving as the light emitting element; and
    a translucent resin layer which seals the light emitting diode chip, and
    wherein the condenser lens, the reflecting surface, and the refractive surface are integrally formed by forming the translucent resin layer; and
    wherein the translucent resin layer is provided with a groove portion or a cutout portion having a concentric circle shape with respect to the optical axis of the condenser lens, the groove portion or the cutout portion being provided on a surface of the translucent resin layer facing one end surface of the light projecting side optical fiber, and
    the reflecting surface is formed by the cutout portion or an inner circumferential surface of the groove portion.

2. The main body unit of the optical fiber photoelectric sensor according to claim 1,
    wherein the translucent resin layer is provided with the groove portion.

3. The main body unit of the optical fiber photoelectric sensor according to claim 1, wherein the reflecting surface is formed by the inner circumferential surface of the groove portion which is annularly provided at the upper surface of the light projecting unit, and a peripheral portion of the groove portion at the upper surface of the light projecting unit serves as a butted surface of the light projecting side optical fiber.

4. An optical fiber photoelectric sensor comprising:
    a light projecting side optical fiber which guides light to be projected toward a detection area;
    a light receiving side optical fiber which receives light from the detection area and guides the light; and
    a main body unit which includes an attaching portion for attaching the light projecting side optical fiber and the light receiving side optical fiber, a light projecting unit that projects light to the light projecting side optical fiber attached to the attaching portion, and a light receiving unit that receives light received by the light receiving side optical fiber, and detects an object to be detected in the detection area based on an amount of light received by the light receiving unit,
    the light projecting unit including:
    a light emitting element which emits light;
    a condenser lens which is provided between the light emitting element and one end surface of the light projecting side optical fiber attached to the attaching portion, and makes the light emitted from the light emitting element converge to one end surface of the light projecting side optical fiber attached to the attaching portion;
    a reflecting surface which is provided around the condenser lens in a substantially concentric circle shape with respect to an optical axis of the condenser lens, and makes light emitted from the light emitting element to around the condenser lens reflect in a direction coming close to the optical axis of the condenser lens; and a refractive surface which is provided between the condenser lens and the reflecting surface in a substantially concentric circle shape with respect to the optical axis of the condenser lens, and makes the light reflected by the reflecting surface refract from the direction coming close to the optical axis of the condenser lens to a direction along the optical axis and incident on one end surface of the light projecting side optical fiber attached to the attaching portion at an incident angle satisfying reflection conditions in an inside of the light projecting side optical fiber; and wherein the translucent resin layer is provided with a groove portion or a cutout portion having a concentric circle shape with respect to the optical axis of the condenser lens, the groove portion or the cutout portion being provided on a surface of the translucent resin layer facing one end surface of the light projecting side optical fiber, and the reflecting surface is formed by the cutout portion or an inner circumferential surface of the groove portion.

5. The optical fiber photoelectric sensor according to claim 4, wherein the light projecting side optical fiber is a multicore optical fiber which includes a light projecting lens provided at an end surface through which light is projected to the detection area.

* * * * *